(12) United States Patent
Robinson (10) Patent No.: US 8,072,552 B2
(45) Date of Patent: Dec. 6, 2011

(54) STEREOSCOPIC EYEWEAR

(75) Inventor: Michael G. Robinson, Boulder, CO (US)

(73) Assignee: RealD Inc., Beverly Hills, CA (US)

( * ) Notice: Subject to any disclaimer, the term of this patent is extended or adjusted under 35 U.S.C. 154(b) by 973 days.

(21) Appl. No.: 11/465,715

(22) Filed: Aug. 18, 2006

(65) Prior Publication Data

US 2006/0285026 A1    Dec. 21, 2006

Related U.S. Application Data

(60) Provisional application No. 60/595,963, filed on Aug. 19, 2005.

(51) Int. Cl.
*G02F 1/1335* (2006.01)

(52) U.S. Cl. ......................................... 349/15

(58) Field of Classification Search ...................... 349/15
See application file for complete search history.

(56) References Cited

U.S. PATENT DOCUMENTS

| | | | |
|---|---|---|---|
| 4,388,453 A | 6/1983 | Finkelmann et al. | |
| 4,792,850 A * | 12/1988 | Liptoh et al. | 348/57 |
| 5,392,142 A * | 2/1995 | Mitsutake et al. | 349/77 |
| 5,523,863 A * | 6/1996 | Fergason | 349/89 |
| 5,587,211 A | 12/1996 | Togano et al. | |
| 5,917,562 A | 6/1999 | Woodgate et al. | |
| 6,124,907 A * | 9/2000 | Jones et al. | 349/96 |
| 6,384,971 B1 | 5/2002 | Faris | |
| 6,671,452 B2 * | 12/2003 | Winston et al. | 385/146 |
| 6,734,936 B1 * | 5/2004 | Schadt et al. | 349/117 |
| 6,751,003 B2 | 6/2004 | Mi | |
| 6,844,913 B2 | 1/2005 | Leidig | |
| 6,874,899 B2 | 4/2005 | Leidig et al. | |
| 7,034,098 B2 | 4/2006 | Marck | |
| 7,084,945 B2 | 8/2006 | Nair et al. | |
| 2001/0030727 A1 | 10/2001 | Schadt | |
| 2003/0089956 A1 | 5/2003 | Allen et al. | |
| 2005/0105018 A1 | 5/2005 | Miyata | |

FOREIGN PATENT DOCUMENTS

| | | |
|---|---|---|
| EP | 0919847 A2 | 6/1999 |
| JP | 7198942 A | 8/1995 |
| JP | 11298920 A | 10/1999 |

(Continued)

OTHER PUBLICATIONS

International search report and written opinion of international searching authority for co-pending PCT application No. PCT/US2007/019466 mailed Oct. 16, 2008.

(Continued)

*Primary Examiner* — James Dudek
(74) *Attorney, Agent, or Firm* — Baker & McKenzie LLP (57) ABSTRACT

Described are stereoscopic eyewear, methods and systems for manufacturing the same. The stereoscopic eyewear includes right- and left-eye filters for analyzing stereoscopically-encoded polarized light. The filters are made using a roll-type polarizer having an absorption axis. A polymer alignment layer is deposited on a portion of the roll-type polarizer. A liquid crystal polymer (LCP) layer is deposited on the polymer alignment layer. The polymer alignment layer and LCP layer provides at least one retarder having an optic axis at a predetermined angle to the absorption axis of the roll-type polarizer. Described embodiments include a polymer alignment layer that may include at least one of a linearly photopolymizerable polymer (LPP), a brushed or rolled polyimide.

17 Claims, 6 Drawing Sheets

FOREIGN PATENT DOCUMENTS

| | | | |
|---|---|---|---|
| JP | 2003315798 | A | 11/2003 |
| JP | 2004053770 | A | 2/2004 |
| JP | 2004078191 | A | 3/2004 |
| WO | 2004008197 | A1 | 1/2004 |

OTHER PUBLICATIONS

International search report and written opinion of the international searching authority for corresponding PCT application No. PCT/US06/32394 mailed Mar. 11, 2008.

Robinson et al.; U.S. Appl. No. 11/424,087, filed Jun. 14, 2006 entitled "Achromatic Polarization Switches" (not yet published).

International preliminary report on patentability from corresponding PCT/US06/32394.

Supplementary European Search Report from co-pending European application No. 06813550.8 filed Aug. 18, 2006, EP Publication No. 1922583 published May 21, 2008 (Applicant RealD Inc., parent owner of applicant ColorLink, Inc.).

Examination Report from co-pending European application No. 06813550.8 dated Mar. 29, 2011.

Notice of Reasons for Rejection in co-pending Japanese application No. 2008-527179.

* cited by examiner

STEREOSCOPIC EYEWEAR

CROSS-REFERENCES TO RELATED APPLICATIONS

This application claims priority to U.S. provisional patent app. No. 60/595,963, entitled "Matched Stereoscopic Passive Eyewear," filed Aug. 19, 2005, which is hereby incorporated by reference.

TECHNICAL FIELD

This disclosure relates generally to stereoscopic eyewear, and more in particular to passive stereoscopic eyewear for polarization-encoded imagery.

BACKGROUND

Stereoscopy, stereoscopic imaging, or three-dimensional (3-D) imaging is any technique capable of recording 3-D visual information or creating the illusion of depth in an image. The illusion of depth in a photograph, movie, video game, or other two-dimensional image is created by presenting a slightly different image to each eye. Many 3-D displays use this method to convey images. Traditional stereoscopic imagery includes creating a 3-D illusion, starting from a pair of 2-D images. The easiest way to create depth perception in the brain is to provide the eyes of the viewer two different images, representing two perspectives of the same object, with a minor deviation similar to the perspectives that both eyes naturally receive in binocular vision.

Various types of 3-D imaging techniques are known, including polarization encoding of the light bound for each eye with different polarizations. Such schemes may involve using orthogonally linearly polarized states, or circularly polarized states of opposite handedness.

With respect to linearly polarized 3-D schemes, to present a stereoscopic picture, two images are projected superimposed onto the same screen though orthogonal polarizing filters. It is best to use a silver screen so that polarization is preserved. The viewer wears eyeglasses, which also contain a pair of orthogonal polarizing filters. As each filter only passes light, which is similarly polarized and blocks the orthogonally polarized light, each eye only sees one of the images, and the effect is achieved. Linearly polarized glasses require the viewer to keep his or her head level, as tilting of the viewing filters will cause the images of the left and right channels to bleed over to the opposite channel (also known as crosstalk). In addition, since no head tracking is involved, several people can view the stereoscopic images at the same time.

With regard to the circularly polarized 3-D image systems, to present a stereoscopic picture, two images are projected superimposed onto the same screen through circular polarizing filters of opposite handedness. The viewer wears eyeglasses, which contain a pair of analyzing filters (circular polarizers mounted in reverse) of opposite handedness. Light that is of left-circular polarization is extinguished by the right-handed analyzer; while right right-circularly polarized light is extinguished by the left-handed analyzer. The result is similar to that of stereoscopic viewing using linearly polarized glasses, except the viewer can tilt his or her head and still maintain left/right separation. Lipton, in U.S. Pat. No. 4,792,850, uses electronically driven circular polarizers that alternate between left and right handedness, and do so in synchronization with the left or right image being displayed by the movie projector. Direct view displays may also be used to encode the polarization states for different eyes, for example, by having alternate pixels of polarization encoded. Another possibility is when a single display or projector creates alternate right/left eye images that are actively encoded using a polarization switch, such as that disclosed in commonly-assigned patent application Ser. No. 11/424,087, entitled "Achromatic Polarization Switches" filed Jun. 14, 2006, which is hereby incorporated by reference.

Polarized motion pictures have been around since the middle of the twentieth century. In order to watch such a movie, the viewer is usually given a pair of paper or plastic polarization glasses to wear to watch the show. However, such glasses can be expensive to produce, and offer a relatively low performance, which can cause the viewer to incur eye strain, headaches, and generally a negative perception of stereoscopic imagery. Accordingly, it would be desirable to have a method and apparatus for producing high performance and low-cost stereoscopic eyewear.

SUMMARY

Disclosed herein are stereoscopic eyewear, methods and systems for manufacturing the same that address the above needs and others. The stereoscopic eyewear includes right- and left-eye filters for analyzing stereoscopically-encoded polarized light. The filters are made using a roll-type polarizer having an absorption axis. A polymer alignment layer is deposited on a portion of the roll-type polarizer. A liquid crystal polymer (LCP) layer is deposited on the polymer alignment layer. The polymer alignment and LCP layers provide at least one retarder having an optic axis at a predetermined angle to the absorption axis of the roll-type polarizer. Described embodiments herein include a polymer alignment layer that may include at least one of a linearly photopolymizerable polymer (LPP), a brushed or rolled polyimide.

In an embodiment, stereoscopic eyewear includes a filter for analyzing circularly polarized light. The filter includes a roll-type polarizer having an absorption axis. The filter also includes a polymer alignment layer deposited on a portion of the roll-type polarizer, and a liquid crystal polymer (LCP) layer deposited on the polymer alignment layer. In this embodiment, the polymer alignment and LCP layers provide a quarter-wave retarder with an optic axis at substantially a 45 degree angle to the absorption axis of the roll-type polarizer.

According to another aspect, a method of manufacturing stereoscopic eyewear for viewing stereoscopic pictures includes providing a roll-type polarizer that has an absorption axis. The method also includes depositing a polymer alignment layer on a portion of the roll-type polarizer. Additionally, the method includes depositing a liquid crystal polymer (LCP) layer on the polymer alignment layer. In accordance with this method, the polymer alignment layer provides substantial alignment to molecules of the LCP layer to provide a retarder with an optic axis at substantially a 45 degree angle to the absorption axis of the roll-type polarizer.

In another embodiment, stereoscopic eyewear includes a filter for analyzing polarized light. The filter includes a roll-type polarizer having an absorption axis. In this embodiment, the filter includes a first retarder deposited on a portion of the roll-type polarizer, in which the first retarder comprises a first polymer alignment layer, and a first liquid crystal polymer (LCP) layer deposited on the first polymer alignment layer. Additionally, the filter has a second retarder deposited on the first retarder, in which the second retarder includes a second polymer alignment layer, and a second LCP layer deposited on the second polymer alignment layer. In some embodiments, additional retarders may be disposed on the filter.

BRIEF DESCRIPTION OF THE DRAWINGS

For a more complete understanding of the principles disclosed herein, and the advantages thereof, reference is now made to the following descriptions taken in conjunction with the accompanying drawings in which.

DETAILED DESCRIPTION

Figure 1:
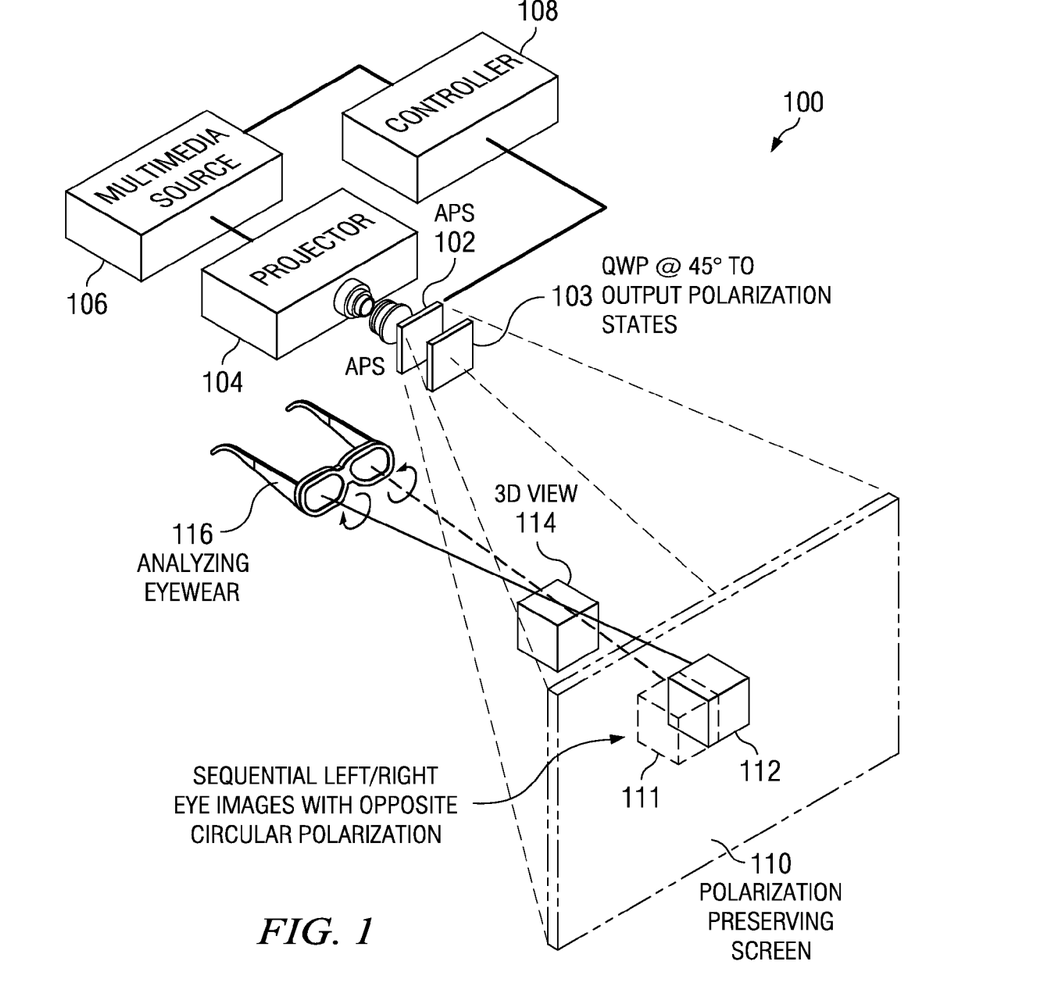
FIG. 1 is a perspective schematic view showing an exemplary 3D stereoscopic projection system in accordance with the present disclosure.

FIG. 1 is a perspective schematic view showing an exemplary 3-D stereoscopic projection system 100. Projection system 100 includes projector 104, a multi-media source 106, a controller 108, and a polarization switch. A polarization switch may be provided by Achromatic polarization switch 102 (APS), as described in commonly-assigned U.S. patent application Ser. No. 11/424,087, entitled "Achromatic Polarization Switches", filed Jun. 14, 2006, which is herein incorporated by reference. APS 102 switches between orthogonal linear polarization states. Thus, in order to project circular polarization states of opposite-handedness, a quarter wave plate (QWP) 103 may be disposed in the light path after APS 102 oriented at 45 degrees to the output polarization states of APS 102. APS 102 provides linear polarization encoding to time-sequentially alter the output polarization state of a display in synchronization with time-sequential images.

To create an appealing flicker-free stereoscopic experience, high resolution, full color images may be shown at a frame rate of at least 100 Hz (50 Hz per eye), and possibly greater. This is possible using various micro display projection technologies, and can be envisioned for the future with faster direct view LCD displays. For example, projector 104 may employ micro display projection based on Texas Instruments DLP™ technology, as this provides an established technology capable of displaying projected images with high frame rate, albeit without polarized output. Liquid crystal-based projector technologies that delivery sufficient temporal performance may also be used with the desired polarized output, making it well matched to the APS 102. In operation, a projector 104 capable of displaying alternate right and left eye images at a rate greater than 120 Hz ($<160^{th}$ second per image) may be synchronized with APS 102 such that successive images of polarization encoded with orthogonal polarization states. Controller 108 controls APS 102 to provide synchronized alternating left and right images. Multi-media source 106 provides the video and audio content, and maybe for example, a DVD player, a digital video recorder, a computer, a video game console, a decoded input stream from internet, cable, terrestrial, or any broadcast service, or the like. In conjunction with the reflected images 111, 112 from polarization preserving screen 110, a viewer with analyzing eyewear 116 would then see right eye images 112 in the right eye, and left eye images 111 in the left eye; suitable stereo images would then result in a 3D image sensation 114.

With any polarization-based discrimination technique, complete two-dimensional images are formed with complementary (e.g., orthogonal, opposite handed circular, or a combination thereof) polarization states. Although this has been described above with respect to a projection system 100, alternative display systems can be used, including spatially patenting direct view displays with micro-polarizers, or by continuously displaying two full-color, high-resolution, complementary polarized images using two displays.

In other embodiments (not shown), polarization based color filters may be used such that successive frames could be color-coded for anaglyph operation. In such embodiments, the screen would not have to be polarization preserving, assuming the analyzing eyewear 116 discriminates between encoded light based on color. Other embodiments may provide hybrid color with polarization systems, with matched polarization filter-based eyewear.

Figure 2:
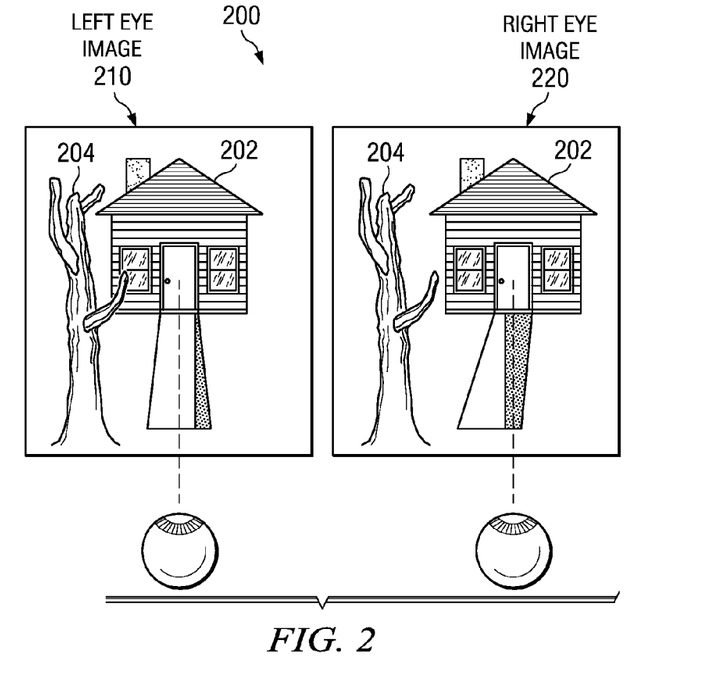
FIG. 2 is a schematic diagram illustrating the concept of creating a depth sensation in the background by stereoscopic imagery.
Figure 3:
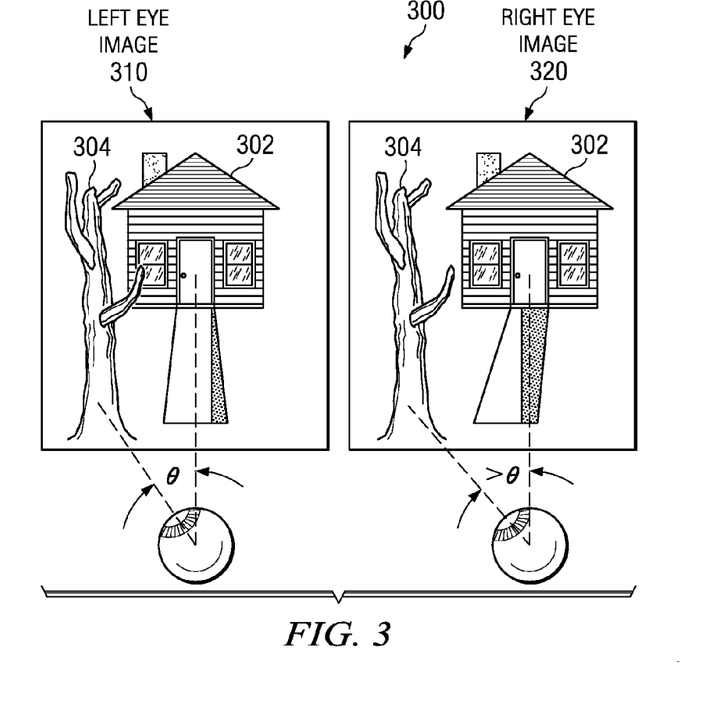
FIG. 3 is a schematic diagram, also illustrating the concept of creating a depth sensation of an object in the foreground by stereoscopic imagery.

FIG. 2 is a schematic diagram 200 illustrating the concept of creating a depth sensation by stereoscopic imagery. Stereoscopic representation of 3-D relies on the convergence and divergence of the eyes to convey depth. Objects closer to the viewer cause the eyes converge, whereas those further away diverge the eyes to a point where they have a parallel optical axis. As such, the diagram 200 shows house 202 in the background at infinity. To accomplish this, separate left and right eye images, 210, 220 are created, whose contents might have superimposed regions corresponding to objects in the background and other regions that are offset representing objects in the foreground. For instance, FIG. 3 is a schematic diagram 300, which illustrates the concept of creating a depth sensation of an object in the foreground. Accordingly, separate left and right eye images 310, 320 have contents with superimposed regions corresponding to background (house 302 has near parallel viewing axes) and other regions that are offset by θ degrees for left eye image 310 and greater than θ degrees for right eye image 320. Thus, tree 304 appears in the foreground to a stereoscopic viewer. Referring back to FIG. 2, the house 202 which is in the background, appears in the background because the eyes are at a point where they have near parallel viewing axis.

Figure 4:
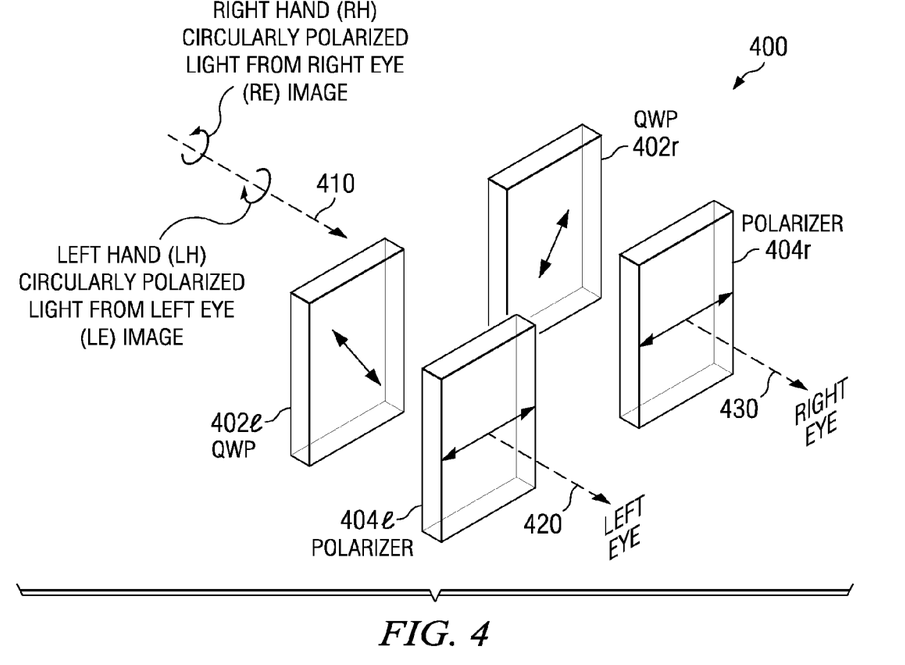
FIG. 4 is a schematic block diagram illustrating an embodiment configured to decode circularly polarized light of right- and left-handedness in accordance with the present disclosure.

FIG. 4 is a schematic block diagram illustrating an embodiment configured to decode circularly polarized light of right- and left-handedness. Left-hand (LH) circularly polarized light arrives from the left-eye (LE) image. Right-hand (RH) circularly polarized light arrives representing the right-eye (RE) image. Vice versa, in other embodiments, this encoding scheme may be reversed e.g., LH to RE, and RH to LE. Referring back to the presently-described embodiment, light 410 arrives at quarter wave plates (QWP) 402*l* and 402*r*, for the left and right eye images, respectively. The optic axes of QWP 402*l* and 402*r* are orthogonal, and are both oriented at ±45 degrees relative to their respective polarizers 404*l* and 404*r*, as arranged in FIG. 4.

In a conventional embodiment of stereoscopic eyewear, the QWP and polarizer, have been laminated together as separate layers, each one from separate roll stock to provide a low-cost optical filter for stereoscopic eyewear. However, stretched polymer retarders from roll stock have an optical access along the "so-called" web. Thus, laminating retarder film from roll stock to polarizer roll stock at oblique angles (e.g., 45 degrees) cannot be carried out in an efficient roll-to-roll manufacturing process because the stretched polymer retarder (or the polarizer) roll-stock has to be cut, aligned, and laminated at a suitable orientation in order to complete the manufacturing of the polarization decoder. Thus, an embodiment that addresses this problem provides a filter for analyzing circularly polarized light which takes a roll-type polarizer having an absorption axis and depositing a linearly photo polymizerable (LPP) layer onto a portion of the roll-type polarizer and depositing a liquid crystal polymer (LCP) layer onto the LPP layer. The LPP and LCP layer provides a retarder with an optic axis at substantially a 45 degree angle to the absorption axis of the roll type polarizer. Accordingly, this provides a low-cost roll-to-roll process which is capable of producing a high-volume of material for decoding circularly polarized light. As will become apparent with reference to FIG. 5, the performance of the circular polarization decoder in accordance with the present disclosure provides greater optical performance than conventional decoders.

Figure 5:
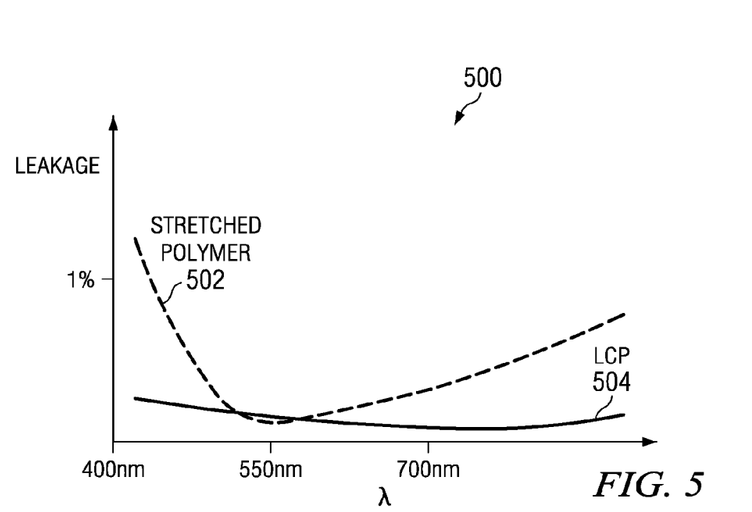
FIG. 5 is a graph illustrating leakage spectra of a conventional circular polarization analyzer, and leakage spectra of a circular polarization analyzer in accordance with the present disclosure.

FIG. 5 is a graph 500 illustrating leakage spectra of a conventional circular polarization analyzer of a conventional circular polarization analyzer in line 502, and leakage spectra of a circular polarization analyzer using LPP/LCP on polarizer roll-stock in accordance with the present disclosure in line 504. Thus, the conventional circular polarization analyzer has a minimum leakage characteristic around 550 nanometers. Chromatic performance is evident for blue and red light wavelengths, either side of 550 nanometers, particularly when the viewer tilts their head, thus negatively affecting the viewing experience. So, magenta light may be seen to contaminate the image under certain conditions. In contrast, the stereoscopic eyewear having a filter using an LCP/LPP-based retarder deposited on polarization roll-stock, which is in accordance with the present disclosure, provides an achromatic performance curve in the visible spectrum, thus providing a superior viewing performance. This increase in performance is mainly attributable to the liquid crystals in the LCP layer having a dispersion characteristic that is matched to the dispersion characteristic of the liquid crystals in the polarization encoder (e.g., an achromatic polarization switch described in Lipton, supra, U.S. Pat. No. 4,792,850.

Figure 6:
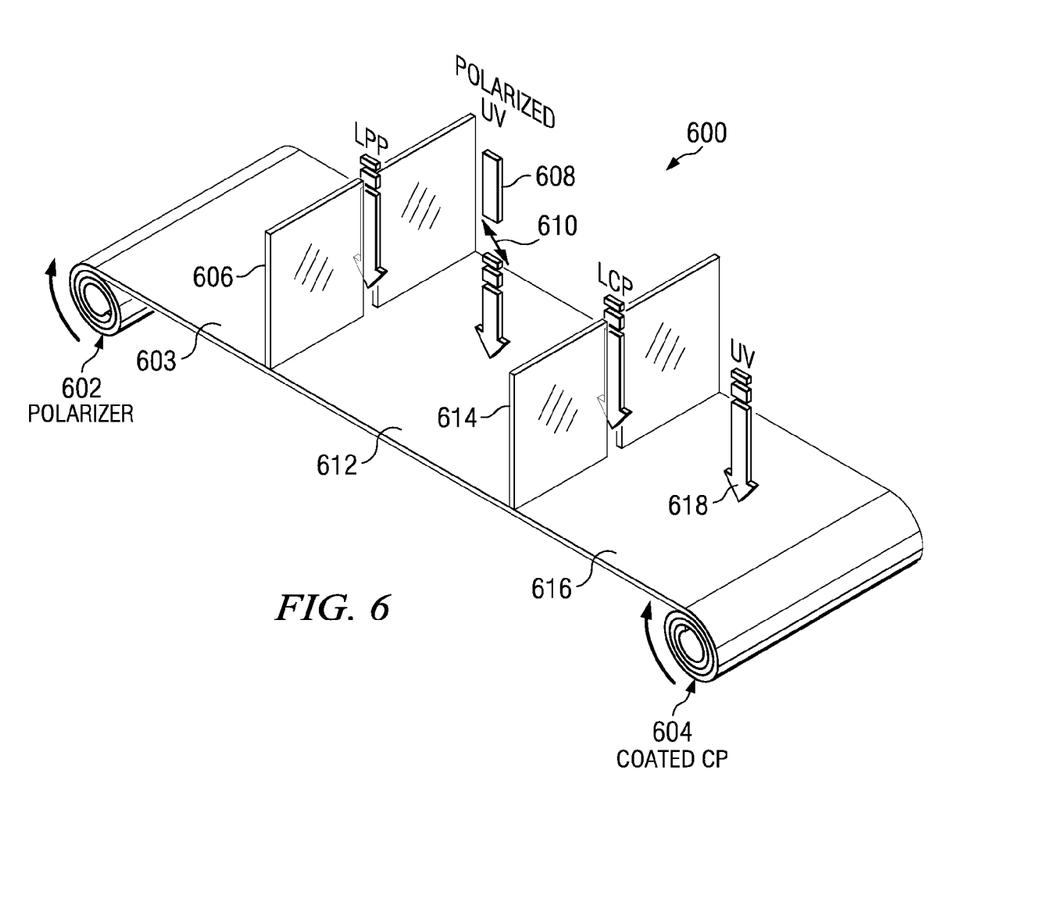
FIG. 6 is a schematic block diagram showing an exemplary system for processing a liquid crystal polymer-based retarder on roll-type polarizer in accordance with the present disclosure.

FIG. 6 is a schematic block diagram showing an exemplary system 600 for processing a liquid crystal polymer-based retarder on roll-type polarizer. The system 600 includes a roll-type polarizer 603 mounted on rollers 602 and 604. Roll-type polarizer 603 typically has an optic axis along the "so-called" web. System 600 also includes an apparatus for depositing an LPP layer 606, a polarized ultraviolet (UV) light source 608, apparatus for depositing an LCP layer 614, and a UV light 618, arranged as shown.

In general, LPP/LCP processes for building retarder layers are known, and described in detail in U.S. Pat. Nos. 6,874,899, 6,844,913, and 7,084,945, which are incorporated by reference for those LPP/LCP processes. Accordingly, it should be appreciated by a person of ordinary skill in the art that although system 600 provides for a single combination LPP/LCP layer to be deposited on polarizer roll stock 603 in one pass, that the LPP deposition apparatus 606 and LCP deposition apparatus 614, as well as the UV lights 608, and 618, may be reproduced along the web a multiple number of times in order to provide multiple numbers of LPP/LCP retarder layers, each layer having different retardance and orientation characteristics. In that regard, other embodiments could incorporate polymer-based eyewear to match to polymer-based polarization encoding, such as that employed by pixel-based special multiplexing or dual projector implementations. In this case, a precise inverse retarder stack can be implemented, while providing for the lowest possible crosstalk. An exemplary continuous roll-to-roll LPP/LCP process is illustrated in U.S. Pat. No. 7,084,945. However, in accordance with the present disclosure, that process is adapted so that the LCP and LPP layers are deposited on roll-stock polarizer, rather than a polymer substrate. It should be noted that while the process in U.S. Pat. No. 7,084,945 is useful as a guide to using LPP/LCP technology, that it was intended to teach manufacture of compensators having an unpolarized transparent support, not a polarizer. It should be appreciated that other LPP/LCP processes known in the art may be used to deposit retarder layers on polarization roll stock, and the process described in U.S. Pat. No. 7,084,945 is merely an exemplary process for the purposes of illustration.

Alternative processes may be used for providing a retarder layer on polarizer roll-stock. Thus, although an LPP/LCP process is one way of providing a retarder that is consistent with this disclosure, several alternatives exist. One such alternative process involves depositing a polyimide layer on the polarized roll-stock. To provide an alignment layer or guide to the LCP, the polyimide may be disposed at a 45 degree (relative to the absorption axis of the polarized roll-stock) using a brush or roller apparatus. The polyamide may be cured by heating. The LCP may then be applied thereon, such that the brushed/rolled polyamide layer provides substantial alignment to the LCP molecules. It should be appreciated that this process can be repeated to provide multiple retarder layers with various orientations.

Furthermore, the present disclosure realizes that in some embodiments, an LPP/LCP process may be used to deposit a first retarder layer on a first portion of polarizing roll stock (e.g., on one side) and a second retarder layer on another portion of roll stock (e.g., on the other side). In an embodiment, the first and second retarder layers have orthogonal orientations. Such orthogonal orientations may be provided by exposing the LPP layer to one polarization of UV light (e.g., from UV light source 608 of FIG. 6) on one side of polarization roll stock and an orthogonal polarization down the other side of polarization roll stock. Alternatively, using the brushed technique described above, opposite sides of a polyimide layer may be brushed in orthogonal directions to provide a similar effect (i.e., without using LPP to align the LCP). An exemplary embodiment of the LPP/LCP process is illustrated with reference to FIGS. 7A and 7B.

Figure 7A:
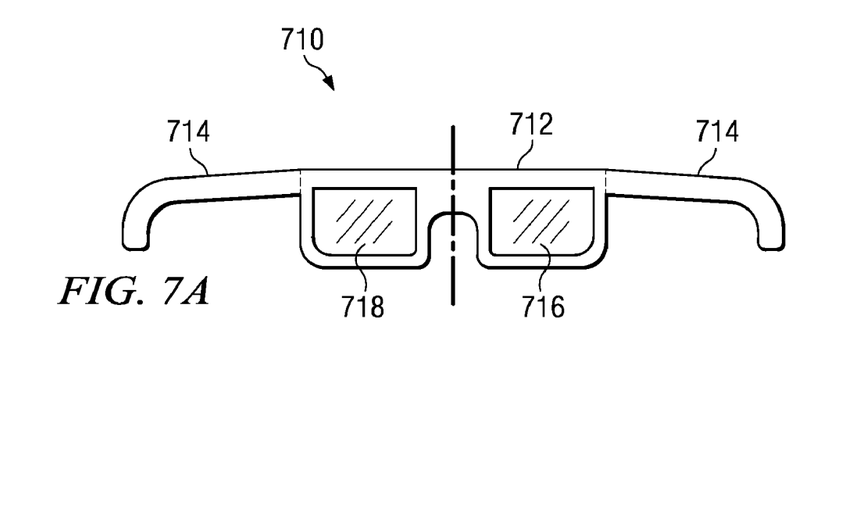
FIG. 7A is a schematic diagram showing exemplary analyzing eyewear in accordance with the present disclosure.

FIG. 7A is a diagram showing exemplary analyzing eyewear 710. Eyewear 710 includes a frame 712, with arms 714 extending therefrom. Frame 712 may be of conventional construction, and use conventional materials such as laminated cardboard, plastic, or a combination thereof. Right-eye lens 716 and left-eye lens 718 is held in place by frame 712.

Figure 7B:
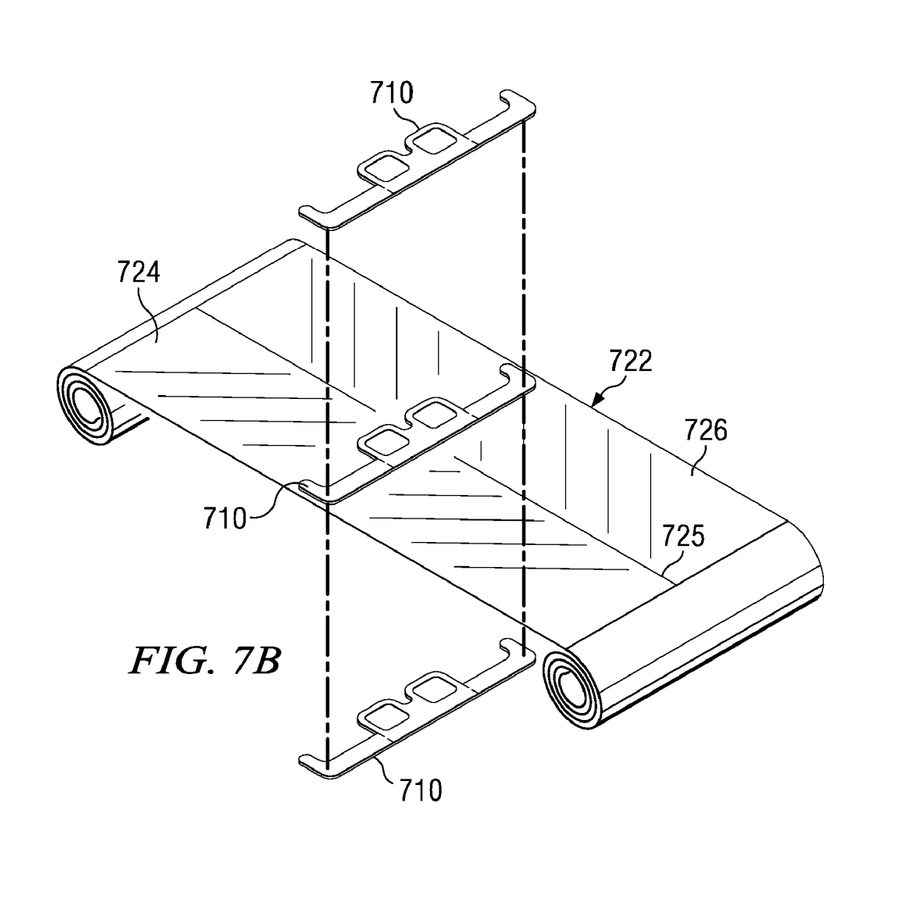
FIG. 7B is a schematic diagram illustrating an exemplary system for manufacturing the analyzing eyewear of FIG. 7A in accordance with the present disclosure.

FIG. 7B is a schematic diagram illustrating an exemplary system for manufacturing the analyzing eyewear of FIG. 7A. In this exemplary embodiment, frames 712*a* and 712*b* may be centered about the interface 725 of the first portion 724 and second portion 726 of the LPP/LCP-polarizer roll stock 722 (i.e., center of the roll). Accordingly, frames 712*a* and 712*b* may be laminated to sandwich the LPP/LCP-polarizer roll stock 722, and the shape of frames 712a and 712b may be cut from the laminated product to provide a low-cost, high volume process for making stereoscopic eyewear 710.

Figure 8:
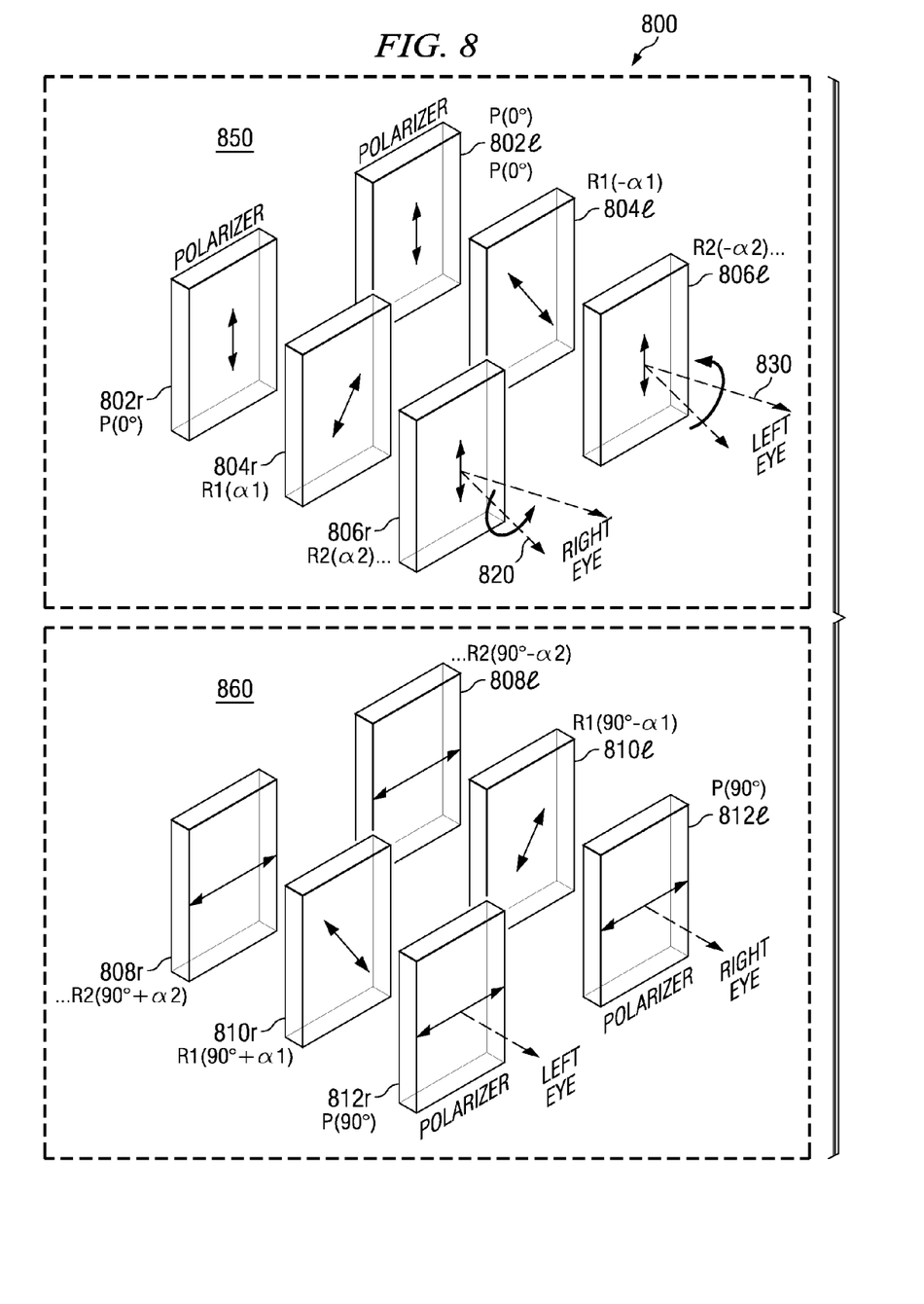
FIG. 8 is a schematic block diagram illustrating another embodiment that provides encoding and decoding of polarized light in accordance with the present disclosure.

FIG. 8 is a schematic block diagram illustrating another embodiment of a polarization encoder/decoder 800 for stereoscopic images and viewing thereof. Encoder/decoder 800 may be configured to match to polymer-based polarization encoding such as that employed by pixel-based special multiplexing or dual projector implementations. In that regard, successive retarder layers with various orientations may be formed on a polarizer to provide a polarization encoder. A matched decoder may be formed by depositing successive retarder layers with orientations that are complementary to the polarization encoder on roll-type polarizer. The matched right- and left-eye decoder would be disposed in spectacle frames and used as analyzing eyewear.

An exemplary polarization encoder/decoder scheme is illustrated by exemplary encoders 850 and decoders 860. Encoders 850 for encoding images destined for the right and left eyes may be located close to right-image and left-image projection lenses from a dual projector system (not shown), or alternatively may be employed in a direct-view display, consistent with a pixel-based spatial multiplexing scheme (not shown).

In this exemplary embodiment, right eye images may be encoded using the polarizer/retarder stack combination including a polarizer 802r, retarder 804r, and retarder 806r, arranged as shown. Polarizer 802r has a vertical absorption axis. Retarder 804r has a retardance R1 and an orientation α1°. Retarder 806r has a retardance R2 and an orientation α2°.

In contrast, left eye images may be encoded using the polarizer/retarder stack combination of polarizer 802l having a vertical absorption axis with retarder 804l, which has a retardance R1 and an orientation −α1°, followed by retarder 806l, which has a retardance R2 and an orientation −α2°. It should be appreciated that further retarder layers may be used in other embodiments, such that successive right eye and left eye retarder layers have related retardances and complementary orientations. Although the encoders 850 could be made using successive LPP/LCP retarder layers deposited on roll-stock polarizer, they may be of alternative varieties, which are more suited to high temperature and high intensity exposure that is present at a projection lens. For instance, polarizers 802r, 802l may be wire-grid polarizers, and retarders may be polycarbonate biaxial material, or the like.

Right-eye encoded light 820 may have an elliptical (or circular) polarization in one direction, while left-eye encoded light 830 may have an elliptical (or circular) polarization in the opposite direction.

In order to decode right- 820 and left-eye light 830, decoder 860 includes a right-eye decoder and a complementary left-eye decoder. Right eye decoder is comprised of retarder 808r, retarder 810r, followed by polarizer 812r. In this embodiment, retarder 808r has a retardance or R2 and an orientation of 90°+α2°; retarder 810r has a retardance or R1 and an orientation of 90°+α1°; and a polarizer 812r with an axis at 90°. Thus generally, it should be noted that the components in the right-eye decoder are stacked in the reverse order to those in the right-eye encoder, and are orthogonal in orientation (by +90°).

The left-eye decoder, in a similar fashion generally has components that are stacked in reverse order to those in the left-eye encoder, and having an orthogonal orientation (by −90°). Accordingly, left eye decoder includes retarder 808l, with retardance R2 and orientation 90°−α2°; followed by retarder 810l, with retardance R2 and orientation 90°−α1°; and polarizer 812l.

As discussed earlier, the polarization decoder may be made using an LPP/LCP process by depositing successive LPP/LCP retarder layers on a roll-type polarizer. Accordingly, an inexpensive but high-performance roll (or sheet) of polarization decoding material results, which is well suited for inclusion in analyzing eyewear.

It will be appreciated by those of ordinary skill in the art that the teachings herein can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes that come within the meaning and ranges of equivalents thereof are intended to be embraced therein.

Additionally, the section headings herein are provided for consistency with the suggestions under 37 C.F.R. §1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. Stereoscopic eyewear comprising:
    a frame;
    a filter for analyzing circularly polarized light, the filter being connected to the frame and comprising:
        a roll-type polarizer cut from polarizer roll stock so as to conform to the frame, the polarizer having an absorption axis;
        a polymer alignment layer contacting a portion of the roll-type polarizer; and
        a liquid crystal polymer (LCP) layer contacting the polymer alignment layer,
        wherein the polymer alignment layer and LCP layer provides a quarter-wave retarder with an optic axis at substantially a 45 degree angle to the absorption axis of the roll-type polarizer.

2. The stereoscopic eyewear according to claim 1, wherein the polymer alignment layer comprises a linearly photopolymerable polymer (LPP).

3. The stereoscopic eyewear according to claim 1, wherein the polymer alignment layer comprises a polyimide, wherein the alignment is provided by one of:
    brushing the polyimide at the substantial 45 degree angle to the absorption axis, or
    applying a roller at the substantial 45 degree angle to the absorption axis.

4. The stereoscopic eyewear according to claim 1, wherein the absorption axis is perpendicular to the axis of a roll carrying the roll-type polarizer.

5. The stereoscopic eyewear according to claim 1, wherein the LCP layer and polymer alignment layer in combination with the sheet polarizer provide an analyzer for analyzing the circularly polarized light.

6. The stereoscopic eyewear according to claim 1, wherein the polymer alignment layer is in the range of 0.01 to 0.1 microns thick.

7. The stereoscopic eyewear according to claim 1, wherein the LCP layer is in the range of 0.1 to 2.0 microns thick.

8. The stereoscopic eyewear according to claim 1, wherein the LCP layer provides a retarder with a retardance of a quarter wave.

9. The stereoscopic eyewear according to claim 1, wherein the LCP layer provides a retarder with a retardance in the range of 100 nm to 200 nm.

10. The stereoscopic eyewear according to claim 1, wherein the filter for analyzing polarized light analyzes one of right handed and left handed circularly polarized light.

11. The stereoscopic eyewear according to claim 1, further comprising a plastic frame for housing the filter.

12. The stereoscopic eyewear according to claim 1, further comprising a paper-based frame for housing the filter.

13. Stereoscopic eyewear comprising:
   a frame;
   a filter for analyzing polarized light, the filter being connected to the frame and comprising:
      a roll-type polarizer cut from polarizer roll stock so as to conform to the frame, the polarizer having an absorption axis;
      a first retarder contacting a portion of the roll-type polarizer, the first retarder comprising:
         a first polymer alignment layer, and
         a first liquid crystal polymer (LCP) layer deposited on the first polymer alignment layer;
      a second retarder contacting the first retarder, the second retarder comprising:
         a second polymer alignment layer, and
         a second LCP layer deposited on the second polymer alignment layer.

14. The stereoscopic eyewear according to claim 13, wherein the first polymer alignment layer comprises a linearly photopolymizerable polymer (LPP).

15. The stereoscopic eyewear according to claim 13, wherein the first polymer alignment layer comprises a polyimide, wherein the alignment is provided by one of:
   brushing the polyimide at the substantial 45 degree angle to the absorption axis, or
   applying a roller at the substantial 45 degree angle to the absorption axis.

16. The stereoscopic eyewear according to claim 13, wherein the first retarder has a first optic axis relative to the absorption axis of the roll-type polarizer, and the second retarder has a second optic axis relative to the absorption axis of the roll-type polarizer.

17. The stereoscopic eyewear according to claim 13, wherein the first retarder has a first retardance value, and the second retarder has a second retardance value.

* * * * *